(12) United States Patent
Gopal

(10) Patent No.: US 7,379,440 B2
(45) Date of Patent: May 27, 2008

(54) SYSTEM AND METHOD FOR REDUCING SETUP LATENCY IN ONE OR MORE SERVICE INSTANCES

(75) Inventor: Thawatt Gopal, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 598 days.

(21) Appl. No.: 10/844,028

(22) Filed: May 12, 2004

(65) Prior Publication Data

US 2005/0254462 A1 Nov. 17, 2005

(51) Int. Cl.
*H04B 7/216* (2006.01)
*H04J 3/22* (2006.01)

(52) U.S. Cl. .................. 370/335; 370/342; 370/441; 370/468; 370/469

(58) Field of Classification Search ............... 370/335, 370/342, 441, 468, 469
See application file for complete search history.

(56) References Cited

U.S. PATENT DOCUMENTS

| 6,608,818 | B1 | 8/2003 | Abrol et al. | |
|---|---|---|---|---|
| 2003/0035393 | A1 | 2/2003 | Sinnarajah et al. | |
| 2003/0143989 | A1 | 7/2003 | Ho et al. | |
| 2003/0206539 | A1* | 11/2003 | Harris | 370/335 |
| 2004/0062227 | A1* | 4/2004 | Sayeedi | 370/350 |
| 2004/0085943 | A1* | 5/2004 | Hsu et al. | 370/338 |
| 2004/0196826 | A1* | 10/2004 | Bao et al. | 370/352 |
| 2005/0037765 | A1* | 2/2005 | Rajkotia et al. | 455/450 |
| 2005/0117521 | A1* | 6/2005 | Abrol et al. | 370/252 |

OTHER PUBLICATIONS

Telecommunications Industry Associate: "Data Service Options for Spread Spectrum Systems: Radio Link Protocol Type 3 (TIA/EIA/IS-707-A-1.10 PN-4541.10)" 'Online! Dec. 1999, pp. 1-52, XP002339639.
3rd Generation Partnership Project 2 "3GPP2": "Upper Layer (Layer 3) Signalling Standard for cdma2000 Spread Spectrum Systems, Release D (3GPP2 C.S0005-D Version 10.0)" 'Online! Feb. 2004, pp. 1-35, XP002339640.

* cited by examiner

*Primary Examiner*—Barry Taylor
(74) *Attorney, Agent, or Firm*—Coats & Bennett, P.L.L.C.

(57) ABSTRACT

Call setup latency for a packet data call dormant reactivation is reduced by bypassing service negotiation and/or RLP Sync exchange procedures using values stored at the BSC. Previously negotiated parameters may be used to bypass service negotiation. A non-zero RTT value, calculated by a previously performed RLP Sync exchange, is stored at the BSC, and transmitted to the MS upon dormant reactivation. The MS uses the RTT to calculate a RLP REXMIT_TIMER value, bypassing a RLP Sync exchange with the BSC. The service configuration parameters and non-zero RTT may be stored at the BSC in the RLP BLOB of a SCR, which may be transmitted to the MS in an SCM. The SCR may store multiple records, each containing negotiated service configuration parameters and/or a non-zero RTT associated with a service instance, selected by a SRID transmitted by the MS.

40 Claims, 4 Drawing Sheets

SYSTEM AND METHOD FOR REDUCING SETUP LATENCY IN ONE OR MORE SERVICE INSTANCES

BACKGROUND OF THE INVENTION

The present invention generally relates to wireless communication network management, and in particular relates to a method of reducing call setup latency when transitioning an established packet data call from a dormant to an active state.

Traditionally, wireless communications networks have existed to support primarily voice services. Voice and similar continuous, point-to-point communications services (e.g., facsimile transmission) are known as circuit switched services, wherein a logical traffic channel is dedicated to the communication session (also referred to herein as a "call"). Increasingly, however, wireless communications networks are being called upon to deliver a broad range of data services, such as email, Web browsing, Instant Messaging (IM), multicasting, multimedia streaming, various Short Messaging Services (SMS), including stock tickers and weather/travel updates, transferring image and video data and the like. Both the range of such non-voice data services and their volume is expected to increase. Such data services are referred to as packet switched services, wherein a dedicated traffic channel is not permanently allocated to each call. Rather, data is packaged into logical, addressable units called packets, and transferred to and from mobile terminals, according to a packet-based network protocol, such as TCP/IP. One option in the wireless communication standard cdma2000 that supports packet data calls is Service Option 33 (SO33), as specified in TIA/EIA/IS-707-A-1.12 or later revisions.

A significant difference between packet switched services and circuit switched services such as voice, is that the packet switched services carry "bursty" data. That is, packet data connections transfer data intermittently, with often significant periods of non-activity bracketing often short periods of voluminous data transfer, depending upon the nature of the service or services being supported. For example, a user engaged in Web browsing typically clicks a link, receives a page download, and peruses the downloaded page for some time before clicking another link or otherwise causing another page to load.

To efficiently deploy limited network resources, packet data connections may be managed based on the "states" of those connections. Resources may be incrementally allocated and deallocated in staged fashion based on the particular state of a given data connection. In cdma2000 networks for example, a packet data call may assume the following states: Active, Control Hold, Idle, and Dormant.

In the active state, the network maintains a full allocation of resources, including dedicated MAC and traffic channels, such that data may be actively received from or transmitted to a user's mobile terminal. If no data is transferred between the network and the mobile terminal within a defined time window, the user's data connection may transition to a dormant state, in which network resources such as traffic channels are freed up to serve other mobile terminals. Upon transition from a dormant to an active state, the wireless communication network allocates the necessary network resources to again provide full data transfer capability to and from the mobile terminal. However, a significant amount of overhead is required in prior art systems to re-establish a packet data call to a mobile station when the call transitions from a dormant to an active state.

For packet data calls in cdma2000, Radio Link Protocol (RLP) is used to transmit and retransmit packet data between the mobile station and a network node such as a base station controller. RLP uses the RLP Sync exchange procedure to estimate the round-trip-time (RTT) between peers of the RLP. The RTT is used in the procedures to retransmit NAKs (Negative Acknowledgement Requests) between peers of the RLP. Prior to the exchange of any user data, RLP needs to perform the RLP Sync exchange procedure to determine the value of RTT. The RTT is then used to derive the RLP REXMIT_TIMER (re-transmit timer). RLP uses the REXMIT_TIMER for processing the NAK list during RLP NAK retransmissions.

An additional requirement in many prior art wireless communication systems to transition a packet data call from dormant to active is a service negotiation procedure as part of the call setup process. One example of a service negotiation procedure for a packet data call is the exchange of a Service Request Message (SRQM) and Service Response Message (SRPM)—perhaps several iterations—followed by a Service Connect Message (SCM) and a Service Connect Completion Message (SCCM) between the base station controller and mobile station. Service negotiation could also occur during a call, e.g., when adding additional service instances using the EOM, CLAM, SRQM, SRPM, SCM, SCCM or UHDM/GHDM.

Both the RLP Synch Exchange and service negotiation procedures contribute to the call setup latency. For applications such as Push To Talk, call setup latency reduction is important to improving the end-user experience. Call setup latency reduction is important to other services also, such as in the establishment of circuit switched voice and packet data services concurrently, and multiple service instances, such as for example up to six packet data service instance. The present invention may reduce call setup latency in all these cases.

SUMMARY OF THE INVENTION

The present invention relates to a method of packet data call dormant reactivation in a CDMA wireless communication network. Upon transitioning the packet data call from an active to a dormant state, a non-zero Round Trip Time (RTT) value is stored at a Base Station Controller (BSC). The RTT value may have been obtained from a RLP Sync exchange between the BSC and a Mobile Station (MS). Upon transitioning the packet data call from a dormant to an active state, the stored RTT value is transmitted from the BSC to the MS. Packet data is then transferred between the BSC and the MS without performing a RLP Sync exchange procedure. The non-zero RTT value may be stored at the BSC in a Service Configuration Record (SCR), which is transferred to the MS upon dormant reactivation of the packet data call. The MS does not need to store or compute the RTT, and uses the transmitted RTT value to determine a value for a RLP REXMIT_TIMER.

In another aspect, the present invention relates to another method of packet data call dormant reactivation in a CDMA wireless communication network. Previously negotiated service configuration parameters are stored at a BSC. Upon transitioning the packet data call from a dormant to an active state, the service configuration parameters are transmitted from the BSC to a MS. Packet data is then transferred between the BSC and the MS without performing a service negotiation procedure as part of the dormant reactivation. The service configuration parameters and other selected data may be stored at the BSC in the SCR. The MS may be instructed to bypass the service negotiation procedure by the BSC sending an Extended Channel Assignment Message (ECAM) with a Granted Mode of '10.' The MS may then receive the service configuration parameters in a SCM including the SCR.

In still another aspect, the present invention relates to another method of packet data call dormant reactivation in a CDMA wireless communication network. A service negotiation procedure to generate service configuration parameters, and a RLP Sync exchange procedure to calculate a non-zero RTT value, are performed between a MS and a BSC. The packet data call is then transitioned from an active to a dormant state. Upon reactivation of the packet data call, the MS receives the service configuration parameters and the non-zero RTT value from the BSC. The MS then transfers packet data with the BSC without performing a service negotiation procedure or a RLP Sync exchange procedure.

In yet another aspect, the present invention relates to a wireless communication network supporting a packet data call between a BSC and at least one MS, wherein the packet data call transitions between active and dormant states. The network comprises a BSC having memory storing a non-zero RTT. The network further comprises a MS receiving the non-zero RTT from the BSC upon the packet data call transitioning from a dormant to an active state, and using the RTT to calculate a RLP REXMIT_TIMER value without performing a RLP Sync exchange procedure with the BSC. The BSC memory may store the non-zero RTT in a SCR. The BSC memory may further store a plurality of SCRs, each including a Service Record Identification (SRI D). The non-zero RTT is transmitted to the MS by sending the SCR whose SRID matches that transmitted from the MS to the BSC, in an SCM upon the packet data call dormant reactivation.

DETAILED DESCRIPTION OF THE INVENTION

Figure 1:
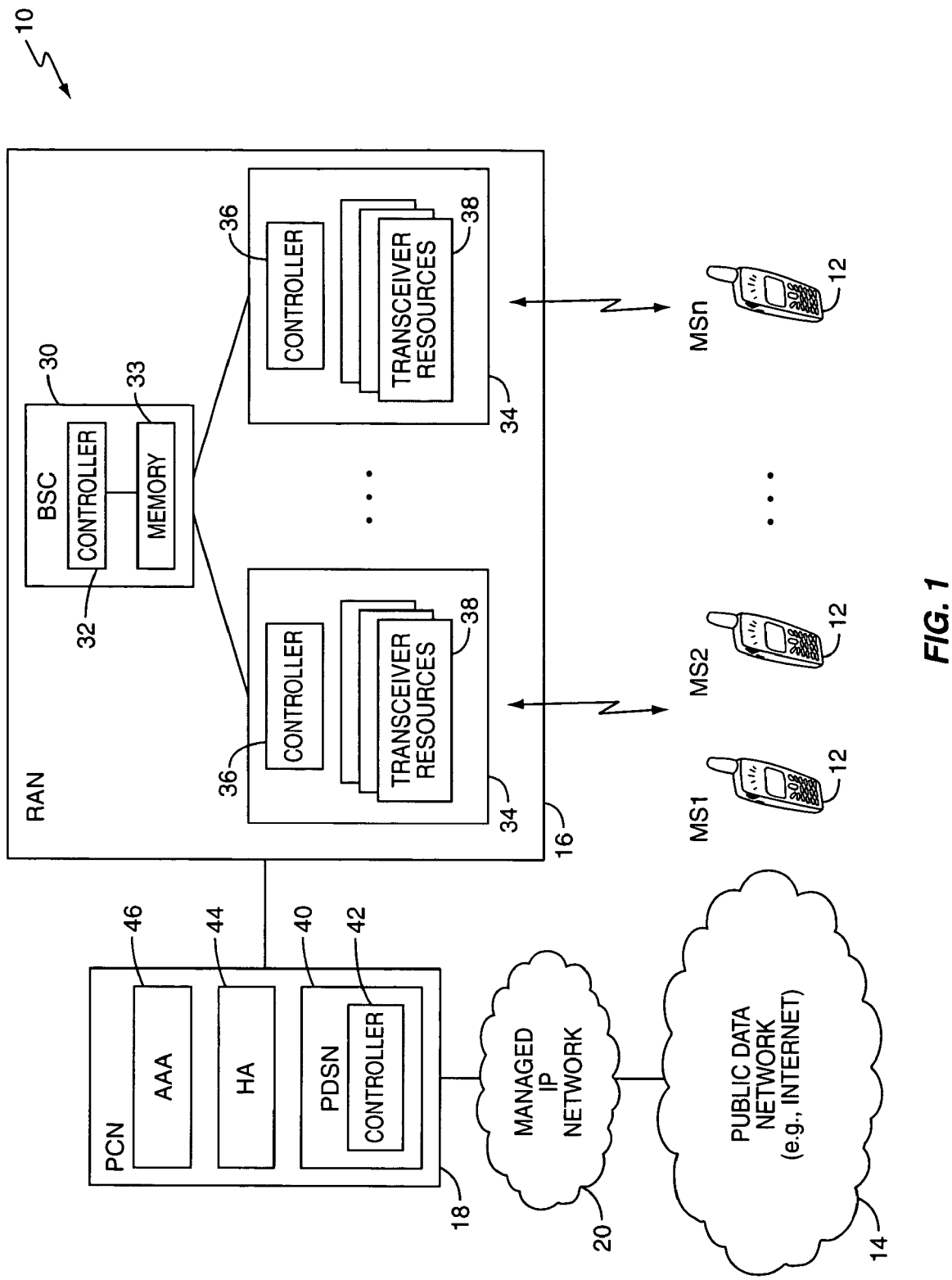
FIG. 1 is a diagram of an exemplary wireless communication network for practicing the present invention.

The following abbreviations and acronyms have the following meaning as used herein:

| | |
|---|---|
| AAA | Authentication, Authorization, and Accounting |
| BLOB | Block of Bits |
| BSAO | Base Station Acknowledgement Order |
| BS | Base Station |
| BSC | Base Station Controller |
| BTS | Base Transceiver System |
| Call setup | Setup of a traffic channel for a new S033 packet data session (ie, there is no A10 binding) |
| CLAM | Call Assignment Message |
| Dormant reactivation | Setup of a traffic channel for an existing S033 packet data session (ie, an A10 binding exists) |
| ECAM | Extended Channel Assignment Message |
| EOM | Enhanced Origination Message |
| FA | Foreign Agent |
| GHDM/UHDM | General/Universal Handoff Direction Message |
| HA | Home Agent |
| MS | Mobile Station |
| MSC | Mobile Switching Center |
| NAK | Negative Acknowledgement |
| NNSCR | Non-Negotiable Service Configuration Record |
| ORM | Origination Message |
| PCN | Packet Core Network |
| PDN | Public Data Network |
| PDSN | Packet Data Serving Node |
| PPP | Point-to-Point Protocol |
| PRM | Page Response Message |
| PTT | Push To Talk |
| RAN | Radio Access Network |
| RBS | Radio Base Stations |
| RC | Radio Configuration |
| REXMIT_TIMER | Re-transmit Timer |
| RLP | Radio Link Protocol |
| RU | Round Trip Time |
| SCM | Service Connect Message |
| SCCM | Service Connect Completion Message |
| SCR | Service Configuration Record |
| S033 | Service Option 33 (packet data call) |

-continued

| | |
|---|---|
| SRID | Service Reference Identifier |
| SRQM | Service Request Message |
| SRPM | Service Response Message |
| A10 binding | The subscriber data portion of the interface between the PCF and the PDSN. |

The present invention provides a method and apparatus to reduce call setup latency when transitioning packet data calls from a dormant to an active state or when adding call service instances. More particularly, according to the present invention, a base station controller stores certain negotiated and calculated parameters after deriving the parameters by successfully completing service negotiation and RLP Sync exchange procedures with a mobile station for a packet data call. The parameters may be stored when a single instance of a packet data call transitions from an active to a dormant state. Additionally, in the case of concurrent services (e.g., a packet data call and a circuit-switched voice call), the parameters are stored prior to adding the voice call to the active packet data call. As yet another example, when a packet data call is ongoing with other service instances, the parameters are stored prior to adding additional service instances. When adding new service instances, service configuration parameters that have been previously negotiated can be reused without requiring the service negotiation procedure to be performed again. Also, with respect to adding packet data call service instances (or dormant reactivation), the Round-Trip-Time (RTT) value calculated as part of a previous RLP Sync exchange, can then be reused. This method reduces the dormant reactivation latency for packet data calls that frequently transition between active and dormant states, and further reduces the call setup latency for subsequent concurrent services instances that involves one or more packet data service instances. The SCR is stored by the base station controller as long as there exists an A10 binding (IMSI, GRE Key, PCF IP Address etc.) associated with the mobile station packet data session.

FIG. 1 illustrates an exemplary wireless communication network generally referred to by the numeral 10. In an exemplary embodiment, network 10 is based on cdma2000, 1xEV-DO/DV standards as promulgated by the Telecommunications Industry Association (TIA), although the present invention is not limited to such implementations. Here, network 10 communicatively couples one or more mobile stations (MSs) 12 to a Public Data Network (PDN) 14, such as the Internet. In support of this functionality, network 10 comprises a Radio Access Network (RAN) 16 and a Packet Core Network (PCN) 18. Typically, the PCN 18 couples to PDN 14 through a managed IP network 20, which operates under the control of network 10.

RAN 16 typically comprises one or more Base Station Controllers (BSCs) 30, each including one or more controllers 32 or other processing systems, with associated memory 33 for storing necessary data and parameters relating to ongoing communications activity. Generally, each BSC 30 is associated with one or more Base Stations (BSs) 34. Each BS 34 comprises one or more controllers 36, or other processing systems, and assorted transceiver resources 38 supporting radio communication with MSs 12, such as modulators/demodulators, baseband processors, radio frequency (RF) power amplifiers, antennas, etc.

BSs 34 may be referred to as Base Transceiver Systems (BTSs) or Radio Base Stations (RBSs). In operation, BSs 34 transmit control and traffic data to MSs 12, and receive control and traffic data from them. BSC 30 provides coordinated control of the various BSs 34, and communicatively couples the RAN 16 to PCN 18 through, for example, a Packet Control Function (PCF) that interfaces to PCN 18 via a Radio Packet Network (RPN) link.

PCN 18 comprises a Packet Data Serving Node (PDSN) 40 that includes one or more controllers 42, or other processing systems, a Home Agent (HA) 44, and an Authentication, Authorization, and Accounting (AAA) server 46. The PDSN 40 operates as a connection point between the RAN 16 and the PDN 14 by establishing, maintaining and terminating Point-to-Point Protocol (PPP) links, and further provides Foreign Agent (FA) functionality for registration and service of network visitors. HA 44 operates in conjunction with PDSN 40 to authenticate Mobile IP registrations and to maintain current location information in support of packet tunneling and other traffic redirection activities. Finally, AAA server 46 provides support for user authentication and authorization, as well as accounting services.

Figure 2:
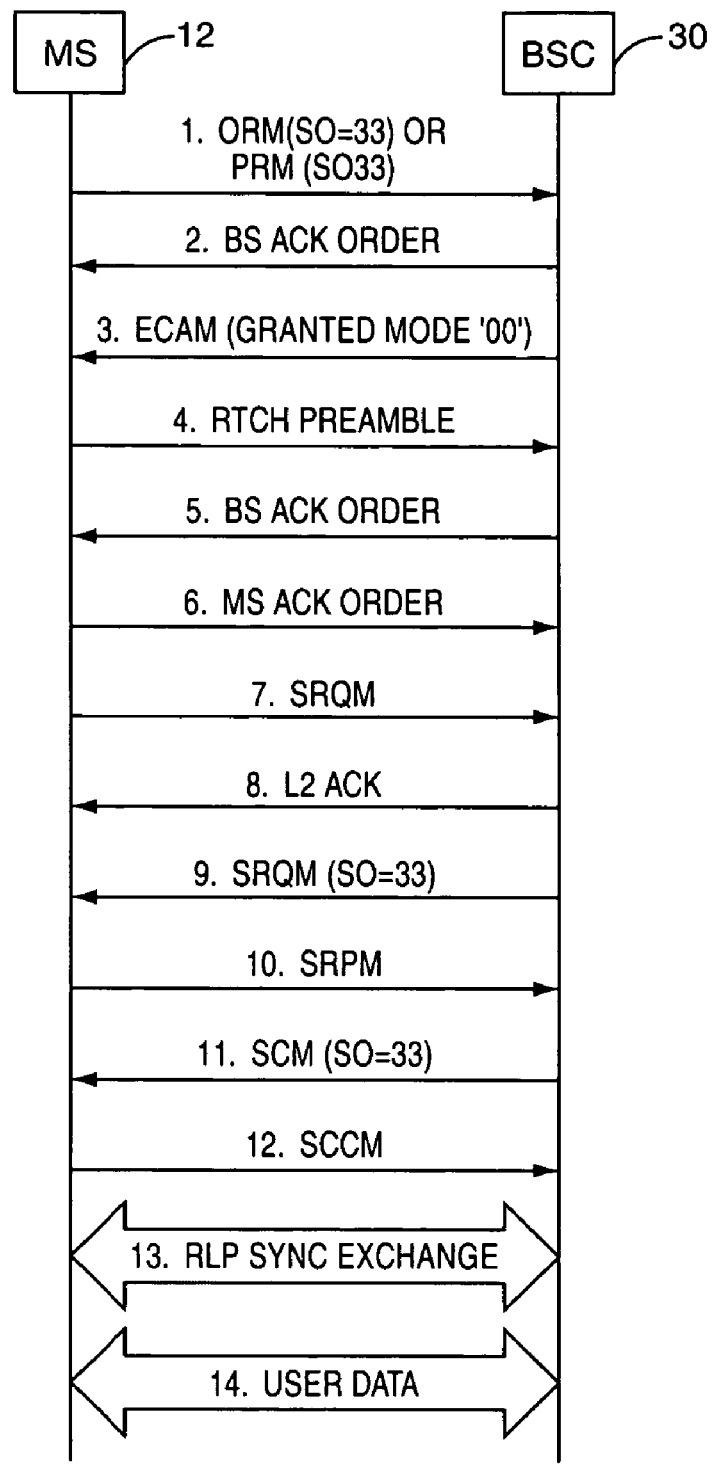
FIG. 2 is a diagram of the air-interface call flow between a mobile station and a base station controller for a new call setup.

Network 10 provides wireless communication services, including packet data services to a plurality of users associated with MSs 12. Due to the nature of the data services provided, the MSs 12 may require data transfer to/from the RAN 16 only sporadically. Consequently, the packet data calls may be transitioned by the BSC 30 between active and dormant states (among other possible states). FIG. 2 depicts the air-interface call flow in setting up a representative SO33 packet data call between a BSC 30 and a MS 12. In prior art wireless communication networks 10, the call setup process of FIG. 2 is also invoked upon transitioning an SO33 packet data call from a dormant to an active state.

The call setup process begins with either an Origination Message (ORM), for a MS-initiated call, or a Page Response Message (PRM) for a BSC-initiated call, from the MS 12 to the BSC 30. The BSC 30 sends an Extended Channel Assignment Message (ECAM) to the MS 12 with a Granted Mode='00' or '01'. (Note: the signaling depicted in FIG. 2 is well known to those of skill in the art; only the messages of particular pertinence to the present invention are discussed herein). As part of the service negotiation procedure, the MS 12 sends the BSC 30 a Service Request Message (SRQM). The BSC 30 may respond with a Service Response Message (SRPM), engaging in service negotiation, or an L2 Ack, as shown, merely acknowledging the SRQM. In this case, the MS 12 the sends the BSC 30 a SRQM, and the BSC 30 responds with an SRPM, engaging in service negotiation. This exchange may be repeated several times, until all necessary service configuration parameters are negotiated between the BSC 30 and the MS 12, referred to herein as "negotiated service configuration parameters" or "negotiated service parameters." Following this exchange, the BSC 30 sends the MS 12 a Service Connect Message (SCM) indicating a packet data call service option, and the MS 12 responds with a Service Connect Completion Message (SCCM).

Figure 4:
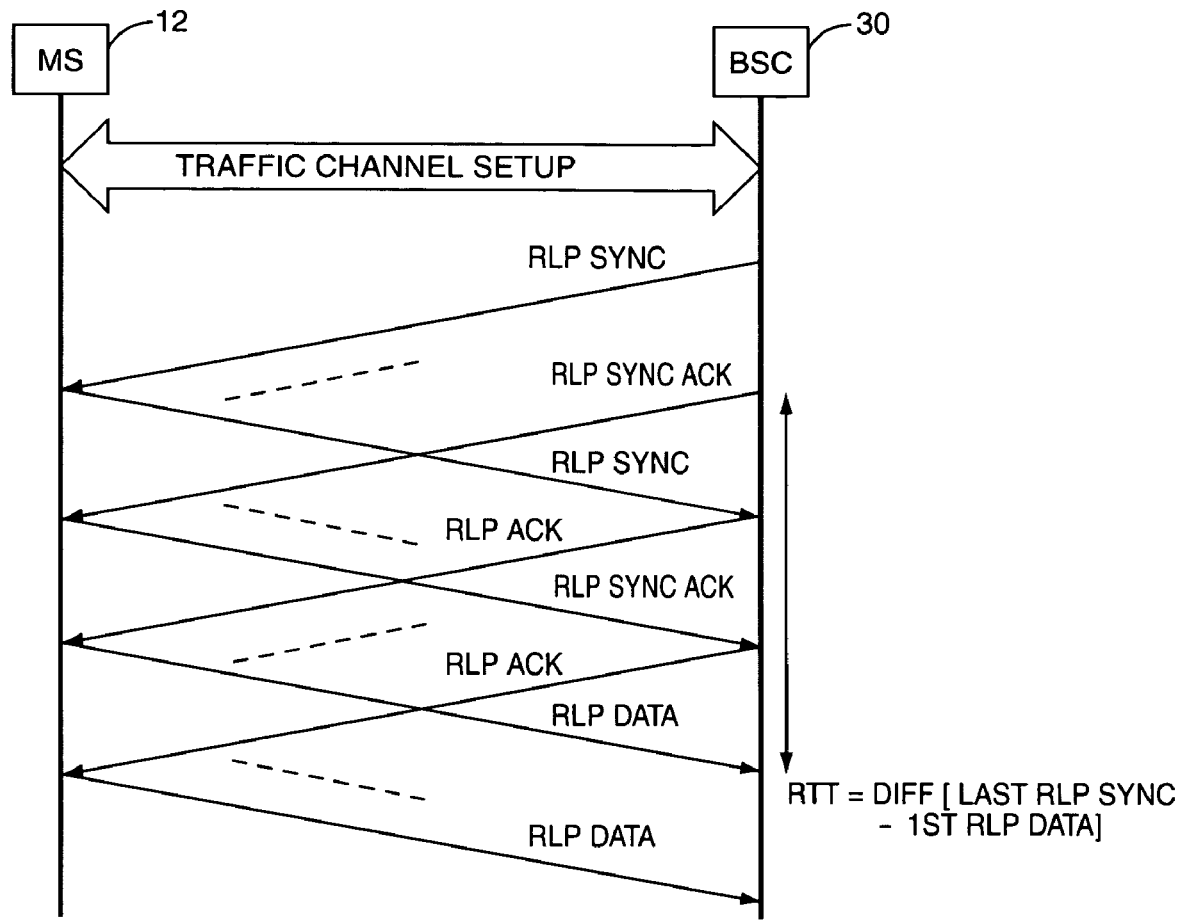
FIG. 4 is a diagram depicting calculation of a Round-Trip-Time value by a base station controller.

The BSC 30 and the MS 12 then engage in a RLP Sync exchange to calculate a non-zero Round-Trip-Time (RTT) value. The RTT at BSC 30 is computed as the time difference in frames between the last RLP Sync control frame transmitted from the BSC 30 and the first instance of receiving good RLP data from the MS 12, as depicted in FIG. 4. This procedure is per TIA/EIA/IS-707-A.1. The RTT is one type of service configuration parameter. That is, as used herein, the term "service configuration parameters" encompasses both negotiated service configuration parameters (such as derived from the exchange of SRQM and SRPM) and an RTT value—either or both may be present in a given set of "service configuration parameters."

The RLP value or RLP RTT value is used by the MS 12 to derive the RLP REXMIT_TIMER (re-transmit timer). The REXMIT_TIMER value is set to an implementation-dependent value greater than RTT to account for implementation-specific buffering mechanisms. RLP uses the REXMIT_TIMER for processing the NAK list during RLP NAK retransmissions. The non-zero RLP RTT value obtained from the last RLP Sync exchange procedure is stored by the BSC 30. For example, the RTT may be stored in the RLP Block of Bits (BLOB), which is part of the Service Configuration Record (SCR) that, according to the present invention, is stored by the BSC 30, such as when the a packet data call transitions from an active to a dormant state, or when a new service instance is added in the case of concurrent services that involves at least one packet data service instance. In general, the BSC 30 always stores the latest version of the RTT associated with the then-current service instance. In addition, the SCR may contain parameters that were negotiated during the service negotiation procedure invoked during the initial call setup.

Figure 3A:
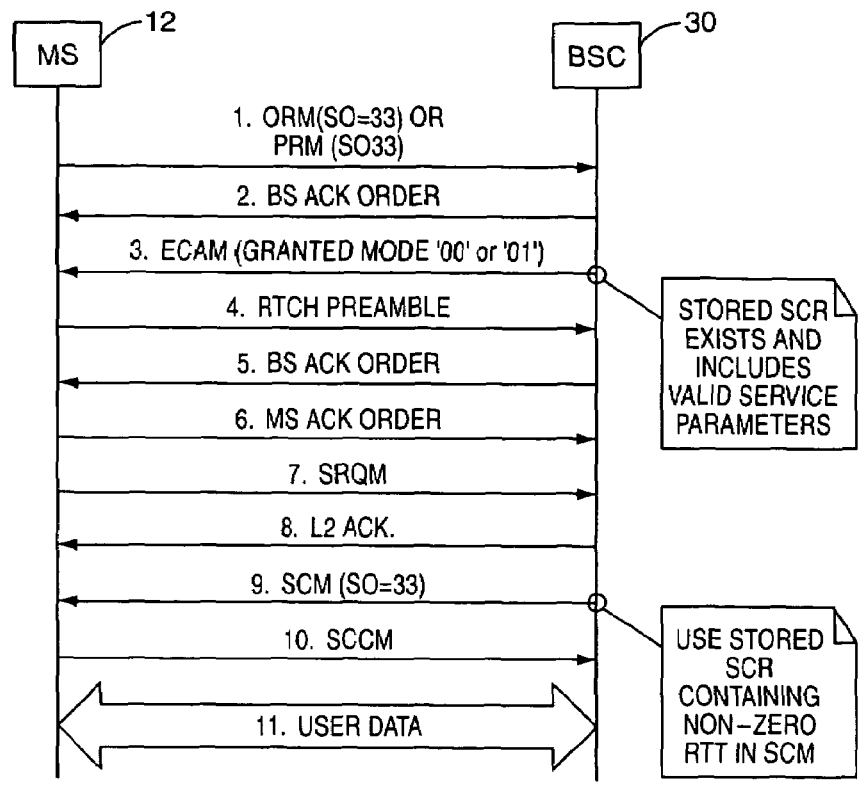
FIG. 3A is a diagram of the air-interface call flow between a mobile station and a base station controller for a packet data call dormant reactivation according to the present invention, using a Granted Mode of '00' or '01'.

According to the present invention, during single-instance packet data call dormant reactivation, i.e., when a single service instance of a packet data call transitions from a dormant state to an active state, the BSC 30 sends the previously negotiated service configuration parameters and the non-zero RTT value to the MS 12 (these parameters may be stored at the BSC 30 in the SCR). This will cause the BSC 30 and MS 12 to bypass both the service negotiation procedure and the RLP Sync exchange procedure, and allow the MS 12 to use the stored/transmitted RLP RTT to determine the RLP REXMIT_TIMER at dormant reactivation. Two representative packet data call dormant reactivation air-interface call flows are depicted in FIGS. 3A and 3B.

The packet data call dormant reactivation begins, as in the case of a new call setup, with either an ORM or PRM from the MS 12 to the BSC 30. If a stored SCR exists and is valid, the BSC 30 sends the MS 12 an Extended Channel Assignment Message (ECAM) with Granted Mode of '00' or '01' as depicted in FIG. 3A. The MS 12 may send the BSC 30 a SRQM, which the BSC 30 acknowledges with a L2 Ack. The BSC 30 does not send a subsequent SRQM to the MS 12, thus avoiding the service negotiation procedure. Rather, the MS 12 uses the previously negotiated parameters sent by the BSC 30 in an SCM.

Figure 3B:
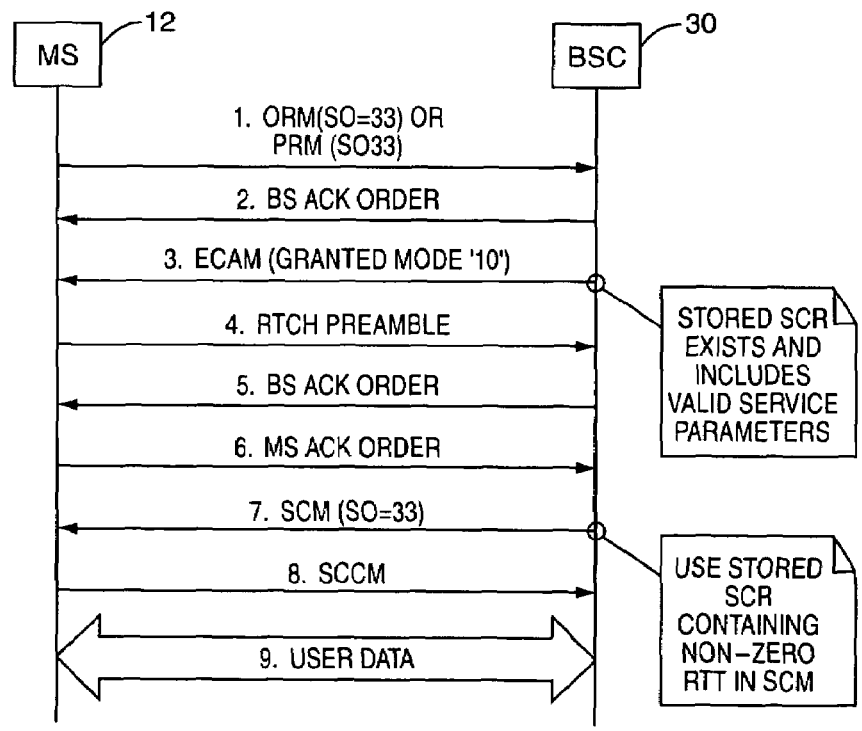
FIG. 3B is a diagram of the air-interface call flow between a mobile station and a base station controller for a packet data call dormant reactivation according to the present invention, using a Granted Mode of '10'.

FIG. 3B depicts an alternative packet data call dormant reactivation call flow procedure. In this case, the BSC 30 also sends the MS 12 an Extended Channel Assignment Message (ECAM), this time with a Granted Mode of '10'. This precludes the MS 12 from sending a SRQM, and the BSC 30 bypasses service negotiation and sends the MS 12 the previously negotiated service configuration parameters in a SCM.

In either case, the BSC 30 also sends to the MS 12 the stored, non-zero value of RTT. A non-zero value for the RTT indicates to the MS 12 that the RLP Sync exchange procedure is to be bypassed. The MS 12 uses the stored/transmitted RTT to calculate a value for REXMIT_TIMER, responds with an SCCM, and the BSC 30 and MS 12 begin data exchange, bypassing the RLP Sync Exchange. The RLP RTT may be transmitted to the MS 12 in a SCM, as indicated in FIGS. 3A and 3B, for a single-instance packet data call dormant reactivation. A relevant RTT may also be transmitted to the MS 12 upon subsequent initiation of a concurrent services call. In this case, the RTT may be transmitted to the MS 12 in an Enhanced Origination Message (EOM), Call Assignment Message (CLAM), SCM or a General or Universal Handoff Direction Message (GHDM/UHDM).

Note that the two methods of single-instance packet data call dormant reactivation latency reduction—bypassing service negotiation and bypassing RLP Sync exchange—are independent. For example, a packet data call dormant reactivation may proceed, bypassing service negotiation as described above. However, if the stored SCR has a zero value for RTT, the zero RTT value will be transmitted to the MS 12 in the SCM, resulting in a RLP Sync exchange between the BSC 30 and the MS 12, to calculate a valid, non-zero RTT value. Alternatively, if certain parameters in the stored SCR are incompatible with allowable options, the BSC 30 may be forced to perform a service negotiation procedure with the MS 12. However, if the SCR contains a valid, non-zero RTT value, the BSC 30 may transmit the RTT value to the MS 12 in the SCM, thus bypassing the RLP Sync exchange procedure.

The reduction in call setup latency for packet data call dormant reactivation according to the present invention is significant. The mean latency reduction due to bypassing service negotiation is estimated to be in the range of 180-250 ms. As the service negotiation procedure exchange of SRQM and SRPM may occur twice or more, the reduction latency from bypassing the procedure may be up to 600 ms. The mean latency reduction due to bypassing RLP Sync exchange is estimated to be in the range of 250-320 ms, for a combined mean latency reduction in the range of 430-570 ms. For a typical 1:1 mobile-to-mobile Push-to-Talk call when both sides are dormant, both the originating and target MS 12 dormant reactivation procedures must be executed before any data can be sent end-to-end. Since the originating MS 12 must transition to active before the target MS 12 is known, both MSs 12 are on the critical path for the call setup. Hence, the delay savings due to not performing service negotiation and RLP Sync exchange procedures apply to both MSs 12 in the mobile-to-mobile PTT call, and the end-to-end call setup latency reduction would be an aggregation of delay savings from each MS 12, for a nominal mean reduction of nearly a second.

A Service Reference Identifier (SRID) is stored with each service instance in the SCR at the BSC 30. This allows for packet data call dormant reactivation according to the present invention in wireless communication networks 10 that support more than one packet data call service instance per packet data session. The SRID is transmitted from the MS 12 to the BSC 30 in an ORM or EOM, but not in a PRM. The BSC 30 will retrieve only the stored SCR record having a matching SRID. If no stored SCR having a matching SRID is found, the packet data call dormant reactivation must proceed as a new call setup (see FIG. 2), i.e., including both service negotiation and RLP Sync exchange. The use by the present invention of the SRID already present as one of the fields in the SCR for service instance identification is particularly advantageous. Prior art systems use a SYNC_ID for this purpose. However, the BSC 30 must always check if the SYNC_ID of the MS 12 matches the SYNC_ID of the BSC 30, and the corresponding SR_ID. According to the present invention, multiple service instances can be uniquely identified merely by comparing the SRIDs in use or requested by the MS 12.

The wireless communication network 10 may support concurrent services—that is, one circuit switched voice service, such as Service Option 3 for an Enhanced Variable Rate Codec (EVRC) call or Service Option 56 for a Selectable Mode Vocoder (SMV) call, and a packet data call, such as Service Option 33. Additionally, the wireless communication network 10 may support multiple service instances—that is, more than one and up to six service instances of packet data calls, as allowed by the CDMA IS-2000 standard. During such concurrent or multiple service operation, if the packet data call transitions from active to dormant state, the current RLP RTT may not be stored in the SCR for use in reduced latency packet data call dormant reactivation as described above. This is because the RLP RTT at that time reflects the multiplexing of both circuit switched voice and packet data on one logical traffic channel; multiplexing delay then depends on mapping of logical to physical channel, and is inaccurate for the packet data call. Thus, according to one embodiment of the present invention, the RLP RTT is stored by the BSC 30, such as in a RLP BLOB that is included in the SCR, upon the packet data call transitioning to concurrent or multiple mode—that is, when the circuit switched voice call or additional packet data calls are added.

One trigger to store this information is when the BSC 30 sends the CLAM to the MS 12 to initiate concurrent services. Hence, during concurrent services, the BSC 30 may maintain both a dynamic SCR (relating to the concurrent service) and a static or stored SCR containing a RLP RTT related to the packet data call. Only the dynamic SCR is updated during the concurrent services operation, and the static SCR is used for packet data call dormant reactivation. If the packet data session is released during concurrent services operation, the BSC 30 should delete the stored SCR. There may be other triggers for storing the non-zero RTT value in concurrent service. For example, when the BSC 30 sends the UHDM/GHDM with the next SCR containing info for the concurrent services, i.e., info for two SRID in the SCR. If the voice call is active, then trigger is when BSC 30 sends the CLAM to the MS 12. If the packet call is active, then the trigger is when UHDM is sent. In general, when the BSC 30 receives an indication that it needs to add additional service instances or drop one or more service instances, then it stores the existing SCR. The specific indication may vary, depending on which service instance was active first and what type of service is added.

While the SCR data is described herein as derived from an initial service negotiation between the BSC 30 and MS 12, the information stored in the SCR is not limited to this source. The information may comprise the contents of a Registration Message sent by the MS 12. Alternatively, the information may comprise the contents of the Mobile Station Status Information Record obtained through the exchange of the Status Request Message and Status Response Message. The Status Information Record can contain information records such as "Service Configuration," "Service Option Information," "Capability Information," "Channel Configuration Capability Information," and the like. The information in the information records can be stored to be used to bypass service negotiation at a later stage. Such information may additionally reach the BSC 30 via other methods.

Furthermore, the SCR stored by the BSC 30 need not necessarily contain all the parameters that are sent over the air. Rather, the BSC 30 may store all, or a subset of, the parameters, and need store only the negotiated parameters. Certain parameters normally stored in the SCR can be regenerated by BSC 30, and the BSC 30 may conserve memory resources by not storing those with the negotiated parameters. In particular, the Non-Negotiable Service Configuration Record (NNSCR) need not be stored at all, as the BSC 30 can regenerate it at call setup or dormant reactivation. This presents significant benefits over prior art attempts to reduce call setup latency, that require the full SCR and NNSCR to be stored (in some cases in the MS 12). Furthermore, these prior art system require the use of a SYNC_ID (synchronization identifier) to identify the stored SCR/NNSCR. Still further, such prior art systems require that the BSC 30 determine, at dormant reactivation, whether all stored parameters are still valid can be reused. The parameters that cannot be reused, such as due to changed system conditions, must be indicated to the MS 12, such as via a SCM. The present invention avoids the complexity and computational requirements of these prior art attempts at call setup latency reduction.

By storing the RTT at the BSC 30 and transmitting it to the MS 12, the MS 12 does not need to expend compute resources calculating a RTT value, or expend memory resources storing the value. The MS 12 also need not store negotiated service configuration parameters. In particular, according to the present invention, the MS 12 need not store a SCR or NNSCR, conserving valuable memory resources on the MS 12.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of packet data call dormant reactivation in a CDMA wireless communication network, comprising:
   upon transitioning said packet data call from an active to a dormant state, storing at a Base Station Controller (BSC) service configuration parameters associated with said packet data call, said service configuration parameters including a non-zero Round Trip Time (RTT) value;
   upon transitioning said packet data call from a dormant to an active state, transmitting said stored RTT value from said BSC to a Mobile Station (MS); and
   transferring packet data between said BSC and said MS without performing a RLP Sync exchange procedure.

2. The method of claim 1 wherein said MS does not store said service configuration parameters.

3. The method of claim 1 wherein said MS does not calculate said RTT value.

4. The method of claim 1 wherein said BSC calculates said RTT value.

5. The method of claim 1 wherein said MS uses said transmitted RTT value to determine a value for a RLP REXMIT_TIMER.

6. The method of claim 1 wherein said packet data call is a single service instance.

7. The method of claim 1 wherein said packet data call is a Service Option 33 (SO33) call.

8. The method of claim 1 wherein said service configuration parameters are stored in a Service Configuration Record (SCR).

9. The method of claim 8 wherein said SCR stored at said BSC includes at least a RLP Block of Bits (BLOB) containing said RTT value.

10. The method of claim 1 wherein said RTT value gets updated.

11. The method of claim 1 wherein transmitting said stored RTT value from said BSC to said MS comprises transmitting said RTT value in a Service Connect Message (SCM).

12. The method of claim 8 wherein said SCR includes a Service Reference Identifier (SRID).

13. The method of claim 1 wherein storing at a BSC service configuration parameters associated with said packet data call further includes storing service configuration parameters previously negotiated between said BSC and said MS.

14. The method of claim 13 wherein said previously negotiated service configuration parameters are transmitted from said BSC to said MS.

15. The method of claim 13 wherein said MS does not store said previously negotiated service configuration parameters.

16. The method of claim 1 wherein said BSC does not store non-negotiated service configuration parameters.

17. The method of claim 1 wherein upon dormant reactivation, said BSC sends to said MS an ECAM including a Granted Mode having a value selected from the group consisting of '00', '01' and '10'.

18. The method of claim 1 wherein said packet data call is a single service instance, and further comprising:
adding an additional service instance, wherein the RTT value is stored prior to adding said additional service instance.

19. The method of claim 18 wherein said additional service instance is a circuit switched call.

20. The method of claim 19 wherein said circuit switched call is an Enhanced Variable Rate Codec (EVRC), Service Option 3 call.

21. The method of claim 19 wherein said circuit switched call is a Selectable Mode Vocoder (SMV), Service Option 56 call.

22. A method of packet data call dormant reactivation in a CDMA wireless communication network, comprising:
storing at a BSC service configuration parameters, including the latest non-zero Round-Trip Time (RTT) value, previously negotiated between said BSC and a MS;
upon transitioning said packet data call from a dormant to an active state, transmitting said service configuration parameters from said BSC to the MS; and
transferring packet data between said BSC and said MS without performing a service negotiation procedure.

23. The method of claim 22 wherein upon transitioning said packet data call from a dormant to an active state, said BSC sends said MS an Extended Channel Assignment Message (ECAM) with a Granted Mode selected from the group consisting of '00', '01' and '10'.

24. The method of claim 22 wherein transmitting said service configuration parameters from said BSC to the MS comprises transmitting said negotiated service configuration parameters from said BSC to said MS in a SCM.

25. The method of claim 22 wherein said BSC does not store non-negotiable service configuration parameters.

26. The method of claim 22 wherein said MS does not store negotiated service configuration parameters or non-negotiated service configuration parameters.

27. The method of claim 22 wherein transmitting said service configuration parameters from said BSC to the MS further comprises transmitting said non-zero RTT from said BSC to said MS, and wherein transferring packet data between said BSC and said MS further comprises transferring packet data between said BSC and said MS without performing a RLP Sync exchange procedure.

28. A method of packet data call dormant reactivation in a CDMA wireless communication network, comprising:
upon transitioning said packet data call from an active to a dormant state, storing at a BSC previously negotiated service configuration parameters including a non-zero RTT value;
upon transitioning said packet data call from a dormant to an active state, transmitting said previously negotiated service configuration parameters including said non-zero RTT value from said BSC to a MS; and
transferring packet data between said BSC and said MS without performing a service negotiation procedure or an RLP Sync exchange procedure.

29. The method of claim 28 wherein upon transitioning said packet data call from a dormant to an active state, said BSC sends said MS an Extended Channel Assignment Message (ECAM) with a Granted Mode having a value selected from the group consisting of '00', '01' and '10'.

30. A method of packet data call dormant reactivation in a CDMA wireless communication network, comprising:
performing, between a MS and a BSC, a service negotiation procedure to generate service configuration parameters and a RLP Sync exchange procedure to calculate a non-zero RTT value, and storing the RTT value as part of the service configuration parameters;
transitioning said packet data call from an active to a dormant state;
upon reactivating said packet data call from said dormant state, receiving at said MS said service configuration parameters including said non-zero RTT value from said BSC; and
transferring packet data between said MS and said BSC without performing another service negotiation procedure or another RLP Sync exchange procedure.

31. The method of claim 30 wherein said MS does not store said service configuration parameters or said non-zero RTT value prior to said dormant reactivation.

32. The method of claim 31 where neither said MS nor said BSC store non-negotiable service configuration parameters, and wherein said BSC generates said non-negotiable service configuration parameters and transmits them to said MS upon dormant reactivation.

33. A wireless communication network supporting a packet data call between a BSC and at least one MS, said packet data call transitioning between active and dormant states, comprising:
a BSC having memory storing packet data call service configuration parameters including a non-zero RTT value;
a MS receiving said service configuration parameters including said non-zero RTT value from said BSC upon said packet data call transitioning from a dormant to an active state, and using said RTT value to calculate a RLP REXMIT_TIMER value without performing a RLP Sync exchange procedure with said BSC.

34. The network of claim 33 wherein upon said packet data call transitioning from a dormant to an active state, said BSC transmits an ECAM having Granted Mode having a value selected from the group consisting of '00', '01' and '10' to said MS, said BSC and said MS subsequently transferring packet data without performing a service negotiation procedure.

35. The network of claim 33 wherein said BSC supports a plurality of service instances, wherein the BSC stores a non-zero RTT value associated with each said instance that is a packet data service option type in a SCR, said SCR including a SRID associated with each said service instance, and wherein upon said packet data call transitioning from a dormant to an active state, said BSC transfers to said MS one of said non-zero RTT values whose SRID matches a SRID transmitted to said BSC from said MS.

36. The network of claim 33 wherein said BSC supports a plurality of service instances, wherein the BSC stores a non-zero RTT value associated with each said instance that is a packet data service option type in a SCR, said SCR including a SRID associated with each said service instance, and wherein upon said packet data call transitioning from a dormant to an active state, said BSC transfers to said MS one of said non-zero RTT values whose SRID matches a SRID known to said BSC based on A10 binding information.

37. The network of claim 33 wherein said BSC initiates a voice call following the initiation of the packet data call, and wherein said BSC stores said non-zero RTT value associated with said packet data call prior to initiating said voice call.

38. The network of claim 37 wherein said BSC maintains a dynamic SCR comprising a record with service configuration parameters for both said packet data and said voice service calls, and a static SCR comprising a record with service configuration parameters for said packet data call only, and wherein said static SCR is transmitted to the MS upon the packet data call dormant reactivation to bypass a RLP Sync exchange procedure between said MS and said BS.

39. A method of concurrent service call reactivation in a CDMA wireless communication network, comprising:
  establishing a first service instance call, and storing negotiated service configuration parameters including a first non-zero RTT value associated with said first service instance call at a BSC;
  initiating a second, concurrent service instance call, and storing negotiated service configuration parameters including a second non-zero RTT value associated with said second, concurrent service instance call at said BSC;
  transitioning said second service instance call out of an active state; and
  upon reactivating said second service instance call, transmitting from said BSC to a MS said negotiated service configuration parameters including said second non-zero RTT value associated with said second service instance call; and
  engaging in communications between said BSC and said MS without performing another service negotiation procedure or a RLP Sync exchange procedure.

40. The method of claim 39 wherein both said concurrent service instances involve a packet data call.

* * * * *

UNITED STATES PATENT AND TRADEMARK OFFICE
CERTIFICATE OF CORRECTION

| | |
|---|---|
| PATENT NO. | : 7,379,440 B2 |
| APPLICATION NO. | : 10/844028 |
| DATED | : May 27, 2008 |
| INVENTOR(S) | : Gopal |

It is certified that error appears in the above-identified patent and that said Letters Patent is hereby corrected as shown below:

On The Title Pg, Item (73), under "Assignee", Line 2, after "(publ)" insert -- , Stockholm --.

In Column 4, under Table, Line 34, delete "RU" and insert -- RTT --, therefor.

In Column 9, Line 2, delete "SR_ID." and insert -- SRID. --, therefor.

Signed and Sealed this

Twenty-second Day of December, 2009

David J. Kappos
*Director of the United States Patent and Trademark Office*